United States Patent Office 3,574,731
Patented Apr. 13, 1971

3,574,731
PROCESS FOR RECOVERING ALKYL CARBOXYLIC ACIDS
Roby Bearden, Jr., Baton Rouge, La., assignor to Esso Research and Engineering Company
No Drawing. Continuation-in-part of application Ser. No. 525,292, Feb. 7, 1966. This application Nov. 19, 1968, Ser. No. 777,195
Int. Cl. C07c *51/26, 51/32*
U.S. Cl. 260—533                            10 Claims

ABSTRACT OF THE DISCLOSURE

This invention relates to the recovery of $C_6$ through $C_{30}$ alkyl carboxylic acids from a mixture of oxidation products which are formed by the reaction of an olefin with carbon monoxide and hydrogen in the presence of an oxonation catalyst, i.e., cobalt, and thereafter oxidizing the oxonation product mixture with molecular oxygen to form the oxidation product mixture. The oxidation product mixture, containing carboxylic acids, oxides of said oxonation catalysts and oxidation by-products is reacted in a first stage with sulfur-dioxide in the presence of water to convert the oxides of said oxonation catalyst to water-soluble catalyst sulfates dissolved in an aqueous phase. Thereafter, the aqueous phase formed in the first stage is separated from the non-aqueous phase containing the carboxylic acids and the oxidation by-products, and the latter reacted with a dilute aqueous alkali, whereby the carboxylic acids are recovered as an aqueous solution of alkali carboxylates and the oxidation by-products separate as an alkali-insoluble phase.

CROSS-REFERENCE TO RELATED APPLICATIONS

This application is a continuation-in-part of U.S. Ser. No. 525,292 filed Feb. 7, 1966, now abandoned.

BACKGROUND OF THE INVENTION

This invention relates to an improved method for recovering $C_6$ through $C_{30}$ alkyl carboxylic acids from an oxidation reaction product acid mixture. More particularly, this invention relates to the separation of $C_6$ to $C_{20}$ water-insoluble alkane carboxylic acids from oxidation catalyst residue and oxidation by-products formed in the preparation of the carboxylic acids.

It has recently been discovered that high quality carboxylic acids can be formed by first reacting olefins with carbon monoxide and hydrogen in the presence of an oxonation catalyst at elevated temperatures and pressure to form an oxonation product mixture containing aldehydes having one carbon atom more than the starting olefins. Furthermore, it has been shown that high quality carboxylic acids can be prepared by oxidation of the aldehydes formed by this oxonation process. Oxidation may be conveniently done with air in the presence of the oxonation catalyst or oxidation promoters such as compounds of iron, manganese, chromium, vanadium, and mixtures thereof may be added to accelerate the rate of oxidation. However, in addition to the formation of carboxylic acids, oxides of said oxonation catalyst, i.e., cobalt, and non-acidic and water-insoluble oxidation by-products are formed in the oxidation reaction product acid mixture.

The $C_6$ to $C_{20}$ alkane carboxylic acids are substantially insoluble in water, and accordingly, special methods must be employed to effect their separation in an uncontaminated state from the catalyst oxides and neutral oxidation by-products. Furthermore, acid purification is complicated due to the presence of non-acidic oxidation by-products, e.g., unconverted aldehydes, aldehyde polymers, esters, ketones, acetals, etc., which are also soluble in the crude acid and have boiling points in the same range as the acids. Accordingly, it is difficult to remove the non-acidic oxidation by-products from the acid by straight forward separation techniques, such as distillation.

Purification of the acids to remove these oxidation by-products is usually accomplished using dilute alkali as these non-acidic oxidation by-products are insoluble in dilute alkali. The problem presented with respect to the removal of oxonation and oxidation catalyst residues after oxidation is that these catalysts precipitate as water-insoluble hydrated oxides during such caustic (alkali) extraction. These hydrated oxides are often gelatinous in nature and become suspended in the aqueous phase containing the alkali salts of the product acids and also tend to collect at the interface between the aqueous and alkali insoluble by-product phases, making clean separation of the faces virtually impossible. Time consuming filtrations and extraction with immiscible solvents must usually then be employed to effect their removal. The gelatinous nature of these precipitates results in clogging of the filters and thus greatly increasing the time required for acid purification.

SUMMARY OF THE INVENTION

It has now been discovered that these and other problems are substantially minimized or overcome by the present invention which is directed to a process for separating $C_6$ through $C_{30}$ alkane carboxylic acids from an oxidation reaction product acid mixture containing, in addition to the carboxylic acids, oxides of said oxonation and oxidation catalysts and non-acidic oxidation by-products defined above. A two-step process has been discovered for recovering the purified carboxylic acids from the oxidation reaction product acid mixture by reacting in a first stage the said oxidation-reaction product acid mixture with sulfur dioxide in the presence of water to convert the oxides of said oxonation and oxidation catalysts to water-soluble catalyst sulfate salts, dissolved in an aqueous phase. The aqueous phase formed in the first stage is separated from the non-aqueous phase containing the carboxylic acids. The crude acids, free of metallic oxide residues, may now be separated into an acid product and a non-acid by-product by extraction with a dilute aqueous alkali, such that the carboxylic acids are recovered as an alkali-soluble phase, and said oxidation by-products separate as an alkali-insoluble phase. Conventionally the acids, free now of oxides and non-acid products, may be recovered by "spraying" with mineral acid.

During the first stage of the instant invention, the addition of the $SO_2$ and water converts the water-insoluble chromium, iron, manganese, vanadium or cobalt oxonation and oxidation catalyst residues to water-soluble salts, primarily corresponding to the metal sulfates, whereas the carboxylic acid remains insoluble in water. The water-insoluble phase containing the $C_6$ through $C_{30}$ carboxylic acids along with the alkali-insoluble oxidation by-products can then be removed from the water-soluble catalyst sulfates by any convenient separation technique, e.g., decantation.

The water-insoluble phase formed in the first step of the instant purification process can then be treated with any alkali, e.g., sodium hydroxide or potassium hydroxide. The alkali is usually employed in a dilute aqueous form. The dilute aqueous alkali solutions can contain from about 5 to about 25 wt. percent, preferably 5 to 15 wt. percent. The contact of the water-soluble phase formed in the first purification step (from which the chromium, manganese, iron, vanadium or cobalt catalyst residues have been previously removed) results in the recovery of the carboxylic acid as an alkali-soluble phase, whereas the said oxidation by-product impurities separate as an oily, alkali insoluble phase. $C_6$ to approximately $C_{20}$ alkane carboxylic acids are substantially soluble in dilute aqueous alkali. Carboxylic acids containing more than 20 carbon atoms, e.g., $C_{20}$ to $C_{30}$ alkane carboxylic acids, have only a limited solubility in dilute aqueous alkali, unless they have a high degree of alkyl branching. Hence, when purifying $C_{20}$ to $C_{30}$ carboxylic acids to remove said oxidation by-products therefrom, the dilute alkali can advantageously be employed in the form of dilute solutions in a combined solvent, e.g., an aqueous $C_1$ to $C_4$ alcohol or aqueous acetone, in order to enhance the solubility of the resulting organic acid-alkali metal salts.

The alkali-insoluble oxidation by-products can be readily removed from the alkali-soluble organic acid salts. The purified $C_6$ to $C_{30}$ carboxylic acid alkali metal salts can then be directly converted to the $C_6$ to $C_{30}$ carboxylic acids by treatment (neutralization) with a mineral acid such as sulfuric acid or hydrochloric acid.

The sequence of employing the separation and removal of chromium, iron, manganese, vanadium and cobalt catalyst residues in the first stage of the instant invenition prior to the contact of the $C_6$ to $C_{20}$ carboxylic acids containing the alkali insoluble oxidation by-products with the dilute aqueous alkali in the second stage of the instant invention is a critical feature of this invention. If the acid mixture obtained after oxidation is treated first with an alkali, then the catalyst residues precipitate out as gelatinous hydrated oxides which necessitate difficult, time-consuming filtrations. The instant process substantially overcomes this difficulty, however, because when the oxidation reaction product acid mixture is treated first with sulfur dioxide in the presence of water, the catalyst residues are immediately converted to water-soluble form; primarily sulfates. These metal sulfates can then be extracted into an aqueous phase and are readily separable from both the $C_5$ to $C_{30}$ carboxylic acids and the alkali-insoluble oxidation by-products. Furthermore, no problems are encountered in removing the alkali-insoluble high molecular weight oxidation products from the $C_6$ to $C_{30}$ carboxylic acids once the catalyst residues have been preremoved therefrom.

While not wishing to be bound to any particular theory, it is believed that the action of the sulfur dioxide in the presence of water (sulfurous acid) on the oxidation product acid mixture is to reduce the catalyst residues to a low valence state and at the same time be oxidized to sulfuric acid. The result of this reaction is a water-soluble sulfate of the anion of the particular catalyst. Attempts to remove the catalyst residues by treatment with dilute sulfuric acid fail, due to the relative insolubility of the dilute $H_2SO_4$ compared to $SO_2$ and the higher valence state of the metallic oxide. For example, in the oxo-synthesis of $C_6$ to $C_{30}$ carboxylic acids from $C_5$ to $C_{29}$ olefins, cobalt carbonyl is conventionally employed as an oxo catalyst to catalyze the $C_n$ olefin oxonation to $C_{n+1}$ aldehyde. During the subsequent oxidation stage wherein the $C_{n+1}$ aldehyde is converted to a $C_{n+1}$ acid, the cobalt octacarbonyl (oxidation catalyst) is believed to be converted, upon contact with air or other molecular oxygen-containing gas, to oxides of cobalt, with cobaltic oxide ($Co_2O_2$) being the predominant component of the catalyst residue. This oxidized oxonation catalyst then serves as an oxidation catalyst for the conversion of the aldehydes to the corresponding carboxylic acids. Often, it is desirable to employ an additional oxidation catalyst to improve the rate and selectivity of the oxidation. In these instances compounds of iron, chromium, manganese and vanadium may be added to the crude oxonation product prior to commencing oxidation with air. However, it has been found that it is necessary to remove these highly colored oxidation catalyst residues from the crude acid product contained in the oxidation reaction product acid mixture in order to obtain product acids free of color and inorganic impurities.

In employing sulfur dioxide for the reduction of the metallic oxides and subsequent conversion to sulfates, it is desirable to add the sulfur dioxide as a 1 to 5 wt. percent $H_2SO_3$ aqueous solution. Regardless of the concentration of $H_2SO_3$ in the aqueous $H_2SO_3$ solution, a molar excess of the sulfurous acid based on the molar amount of metallic catalyst residue present in the reaction product mixture (calculated as metal) should be employed. For example, usually 5 to 10% molar excess of sulfurous acid over and above that required for stoichiometric oxidation-reduction reaction will be employed. It has been found that for most purposes, a sulfurous acid solution containing from about 0.1 to 10.0 wt. percent $H_2SO_3$ in water is convenient for use in removing the oxidized oxonation and oxidation catalyst residues from the aforementioned carboxylic acid.

While the addition of the sulfur dioxide in the presence of water can be accomplished over a wide temperature range, it should be emphasized that this purification process is essentially a liquid phase process. Conseqeuntly, the temperature and pressure conditions are correlated to insure liquid phase throughout the purification steps. Temperatures of about 10° to about 100° C. can be employed with comparable pressure to insure liquid phase operation. Generally, however, temperatures of about 20° to 60° C. with pressures of about atmospheric to 100 p.s.i.g. are normally employed.

The invention will be illustrate in greater detail by the examples which follow. It should be clearly understood that these examples are intended to be illustrative of, rather than limiting upon, the present invention.

EXAMPLE 1

(a) The oxo stage: A mixture of 168 g. (2 moles) of hexene-1 and 7 millimoles of preformed cobalt octacarbonyl in heptane (21 g. of solution) was charged to a one-liter stainles steel autoclave. Oxonation was then begun at a synthesis gas pressure of 1800 p.s.i.g. and at 212° F. using a synthesis gas blend containing a mol ratio of $H_2$ to CO of approximately 1.3:1. After 5 hours the uptake of synthesis gas had ceased and the reactor product, 241 g., was discharged. Analysis by gas chromatography showed a 95% yield of aldehyde product with 81% selectivity to the linear aldehyde.

(b) The oxidation stage: A mixture of 28 g. of the oxo product (stage a) and 300 ml. of n-heptane was charged to a glass reactor equipped with stirrer and air inlet tube (frit). Dry air was passed into the mixture at 104° F. until the characteristic green color of the active cobalt oxidation catalyst occurred (7 minutes) and until ΔV measurements on the exit air indicated that oxygen was no longer consumed, i.e., the initial aldehyde charge had been consumed. At this point an additional amount of the oxo product, 172 g., was fed to the reactor at a rate of 0.1 mole aldehyde per hour. The air rate was regulated to supply 0.32 mole of $O_2$ per hour. After 5 hours the reaction was no longer exothermic, and the temperature began to drop from the 104° F. mark held previously by means of an ice bath. At 6 hours there was no further uptake of oxygen and the reaction was terminated. There was recovered 452 g. of oxidation mixture.

(c) Product recovery stage (alkaline extraction): One hundred grams of the oxidation mixture from stage (b) was extracted with 200 g. of an aqueous solution containing 20 g. (0.5 mole) of sodium hydroxide in order to separate the product acids from the alkali insoluble oxidation by-products and heptane diluent. However, the extraction was complicated by the accompanying formation of a voluminous brown-black gel of cobalt hydroxide and/or cobalt oxides (most probably hydrated cobaltic oxide), which subsequently became suspended in the aqueous alkaline extract containing the product acid salts and which also collected at the interface between the aqueous and organic phases. The precipitate thus prevented clean separation of the phases. Furthermore, when it was attempted to regenerate the product acids from a portion of the precipitate-laden alkaline extract by addition of an exces of dilute sulfuric acid, it was found that the cobalt precipitate dissolved very slowly and again created an ill-defined interface between the organic acid and aqueous phases. When the cobalt precipitate was dissolved by prolonged stirring with an excess of dilute acid, it was found that the organic acid phase took on color, indicating recontamination by cobalt. It was therefore necessary to remove the cobalt precipitate prior to separation of the organic and alkaline phases. The method chosen was filtration, a feat accomplished only with exceeding difficulty owing to the gelatinous nature of the precipitate.

The procedure used was to make a crude separation of the organic and aqueous phase, allow several hours for the gel to settle in each phase and then decant as much of the clear liquids as possible. The resultant gel rich phases were then filtered separately. The alkaline aqueous phase present in both of the filtrates was separated, combined with the aqueous phase, decanted initially and then steam stripped to remove traces of organic by-products.

catalyst was still present. The phases were allowed to separate and the organic phase was then extracted with 200 g. of 10 wt. percent aqueous solution of sodium hydroxide. Precipitation of a cobalt gel occurred immediately, thus necessitating recovery of the product acids according to the procedure described in Example 1, stage (c). There was recovered 34.5 g. (72.3 mole percent based on olefin) of $C_7$ carboxylic acids.

EXAMPLE 4

This example indicates that sulfurous acid (sulfur dioxide dissolved in water), due to its reducing capabilities, is unique in the removal of the oxidized oxonation catalyst residues (cobaltic oxides).

A solution of 0.05 gram of cobalt oleate was admixed with 100 ml. of hexane and 2 grams of n-heptaldehyde, under nitrogen at a temperature of 30° C. Attempts to extract the cobalt catalyst compound from:

(a) A cobalt oleate soap solution using 10% sulfuric acid, (b) An oxidized cobalt catalyst residue employing 10% sulfuric acid, and (c) An oxidized cobalt catalyst residue using 4% sulfurous acid, yielded the results tabluated in Table I.

TABLE I

| Pretreat | Extraction agent | Contact time, minute | Color before contact | | Color after contact | | Cobalt COOH layer [3] |
|---|---|---|---|---|---|---|---|
| | | | COOH layer | $H_2SO_4$ layer [1] | COOH layer | $H_2SO_4$ layer [2] | |
| a. None | 10 weight percent $H_2SO_4$ | 0.5 | Purple | None | None | Pink | No. |
| b. Oxidized | Same | 60.0 | Green | None | Green | None | Yes. |
| c. Oxidized | 4 weight percent $H_2SO_3$ | 0.5 | Green | None | None | Pink | No. |

[1] COOH layer contains the carboxylic acids and oxidation by-products and is insoluble in water.
[2] $H_2SO_4$ layer contains (in a and c) sulfates of the cobalt residue and is therefore water soluble.
[3] Caustic added to COOH layer to extract carboxylic acid. Brown precipitate indicates presence of cobalt.

Upon addition of dilute hydrochloric acid to the alkaline solution of acid salts there was obtained 34 g. (71 mole percent based on starting olefin) of $C_7$ carboxylic acids. Neutralization Equivalent (mg. KOH/g.) Calculated: 432; Found: 433.

The problems encountered in the purification of product acids by alkaline extraction, however, were eliminated by removing the cobalt catalyst prior to extraction according to the procedure described in Example 2.

EXAMPLE 2

With vigorous stirring, 80 g. of a 1.5 wt. percent solution of sulfurous acid in water was added to 100 g. of the oxidation mixture obtained in Example 1, stage (b). After 5 minutes contact at 78° F., the pases were allowed to separate. The bottom aqueous phase, now pink in coloration due to the presence of cobalt salts (primarily $CoSO_4$) was drawn off and discarded. The remaining near water white organic layer was extracted with 200 g. of a 10 wt. percent aqueous solution of sodium hydroxide. No precipitate was encountered.

The alkaline extract was separated, steam stripped to remove traces of heptane and alkali insoluble organic materials, and then acidified with dilute sulfuric acid. There was recovered 36 g. (75 mole percent based on starting olefin) of $C_7$ carboxylic acids. Neutralization Equivalent (mg. KOH/g.) Calculated: 432; Found: 434.

That the action of sulfurous acid on the cobalt catalyst to generate water soluble cobalt salts is related to the reducing capabilities of the acid rather than its properties as a strong mineral acid is illustrated in Example 3.

EXAMPLE 3

With vigorius stirring, 80 g. of a 1.5 wt. percent solution of sulfuric acid in water was added to 100 g. of the oxidation mixture obtained in Example 1, stage (b). After 15 minutes contact at 78° F. there was no significant change in the organic layer, i.e., the deep green-black coloration resulting from the oxidation active cobalt As can be seen from the results tabulated in Table I, sulfuric acid can extract the cobalt from the COOH layer in Run a prior to oxidation. However, when the cobalt is oxidized, it resists extraction with a strong mineral acid such as sulfuric acid (Run b) the cobalt residue is not removed from the organic COOH layer (green coloration). Surprisingly, as shown in Run c, sulfurous acid does remove the oxidized cobalt residue from the organic COOH layer, since there is no coloration in the COOH layer after extraction with $H_2SO_4$ nor is there a brown precipitate of hydrated cobalt oxide after extraction with a dilute aqueous alkali. Thus, the reactivity of unoxidized cobalt carboxylate is quite different than the removal of oxidized cobalt residues, as is shown in the manner in which each responds to the above-described acid treatment.

EXAMPLE 5

According to the procedure described in Example 1, stage (b), 200 g. of a mixture comprised of 182.4 (1.6 mole) of a commercially available n-heptaldehyde and 17.6 g. of solution containing 1.63 g. of cobalt octanoate catalyst (4.7 millimoles cobalt) was subjected to air oxidation to prepare heptanoic acid.

Tests on small samples of the oxidation mixture revealed that the oxidation active cobalt catalyst derived from the octoate soap reacted to treatment with sodium hydroxide or with sulfurous acid just as the oxidation active catalyst derived from cobalt oxonation catalyst (refer to Example I). That is, a gelatinuous precipitate formed upon treatment with dilute sodium hydroxide and a water soluble cobalt salt formed when the oxidation mixture was treated with sulfurous acid.

Purification and isolation of the product acid was therefore carried out according to the procedure given in Example 2.

Cobalt was removed from 400 g. of the oxidation mixture by contacting with 180 g. of 2 wt. percent aqueous solution of sulfurous acid. The product acid was then extracted into 300 g. of a 20 wt. percent solution of sodium hydroxide and the alkali insoluble by-products and heptane were discarded. Acidification of the alkaline extract with dilute sulfuric acid gave 166.4 g. (80 mole percent) of heptanoic acid. Neutralization Equivalent Calculated: 308; Found: 306.

EXAMPLE 6

Five grams of a mixture comprised of 57 g. (0.5 mole) of a commercially available n-heptaldehyde and 1 g. of an iron octoate solution (6% iron) and 150 ml. of n-heptane were charged to glass reactor equipped with a stirrer and gas inlet tube. Dry air was metered into the mixture at rate sufficient to supply 0.32 mole oxygen/hr. Upon initiation of oxidation the remainder of the aldehyde feed mixture, 53 g., was fed to the reactor at a rate of 0.1 mole of aldehyde/hr. After seven hours contact at 104° F. there was no further uptake of oxygen and the reaction was terminated. There was recovered 162 g. of oxidation mixture.

Preliminary tests on small samples of the oxidation mixture showed that treatment with sulfurous acid would convert the iron catalyst to a water soluble salt and that treatment with dilute sodium hydroxide solution would result in the formation of a gelatinous precipitate. Therefore, the product acids were recovered according to the procedure described in Example 2. The crude oxidation mixture was stirred with 40 g. of a 2 wt. percent solution of sulfurous acid whereupon the red-black color of the organic layer was discharged and a yellow-green color was generated in the aqueous phase. Subsequent extraction of the organic phase with dilute sodium hydroxide did not produce gel formation, thus confirming the absence of iron. Acidification of the catalyst free alkaline extract gave 39 g. (60 mole percent) of n-heptanoic acid.

EXAMPLE 7

The procedure was exactly that described in Example 5, except that the catalyst was 1 g. of manganese octoate solution (6% Mn). Again, preliminary tests on the oxidation mixture showed that caustic extraction without prior catalyst removal would be complicated by gel formation. Accordingly, the oxidation mixture was stirred with 40 ml. of 2 wt. percent solution of sulfurous acid. The deep red-brown oxidation active color of the manganese catalyst was immediately discharged, leaving a water white organic layer. Manganese now in aqueous phase (presumably the manganeous sulfate-pink coloration) was withdrawn and discarded. Alkaline extraction of the product acids followed by regeneration with dilute sulfuric acid gave 45.5 g. (70 mole percent of n-heptanoic acid).

EXAMPLE 8

Example 5 was repeated except that the catalyst was chromium. One gram of an octoate soap solution (5% chromium) was used. Initiation of oxidation with this catalyst was comparatively slow, requiring approximately 70 minutes whereas Co, Mn and Fe initiated within 5-20 minutes. The oxidation reaction was terminated 4 hours after initiation. There was recovered 167 g. of the crude oxidation mixture.

The oxidation active chromium catalyst was readily converted to a water-soluble salt upon contact with sulfurous acid and alkaline extraction of the product acid from the resultant catalyst free mixture was accomplished without gel formation. After steam stripping to remove traces of alkali insoluble organic materials the alkaline solution was acidified. There was obtained 41 g. (63 mole percent of n-heptanoic acid. Neutralization Equivalent Calucuated for $C_6H_{13}COOH$ (mg. NaOH/g.): 308; Found: 307.

What is claimed is:

1. In a process for forming carboxylic acids wherein an olefin having $n$ carbon atoms wherein $n$ ranges from 5 to about 29, is reacted with carbon monoxide and hydrogen in the presence of a cobalt oxonation catalyst at elevated temperatures and pressure to form an oxonation product containing aldehydes having $n+1$ carbon atoms; reacting said oxonation product with oxygen in the presence of an oxidation promoter selected from the group consisting of (a) chromium, (b) iron, (c) manganese, (d) vanadium and (e) cobalt, and mixtures containing at least two of (a), (b), (c), (d), and (e) to form an oxidation reaction product acid mixture containing carboxylic acids having $n+1$ carbon atoms, oxides of said oxonation catalysts, oxides of said oxidation promoters, and oxidation by-products, said by-products containing compounds selected from the group consisting of unreacted aldehydes, aldehyde polymers, esters, ketones and acetals; the improvement which comprises recovering the carboxylic acids from the oxidation reaction product acid mixture containing the oxides of said oxonation catalyst, the oxides of said oxidation promoters and said oxidation by-products by:
 (a) reacting the oxidation reaction product acid mixture with a stoichiometric excess of sulfur dioxide in the presence of water to form an aqueous phase and a non-aqueous organic phase;
 (b) separating the aqueous phase containing the catalyst residues as sulfates from the non-aqueous organic phase;
 (c) reacting the non-aqueous organic phase with a dilute aqueous alkali to form an extract containing the carboxylic acids as alkali carboxylates and a raffinate containing the oxidation by-products;
 (d) recovering the carboxylic acids from the extract formed in step (c) by neutralization of a mineral acid.

2. A process as in claim 1 wherein said sulfur dioxide and water are contacted with said oxidation reaction product acid mixture as aqueous sulfurous acid and wherein said carboxylic acids are alkane carboxylic acids.

3. A process as in claim 2 wherein said stoichiometric excess of sulfurous acid ranges from about 5 to about 10% stoichiometric excess.

4. The process as in claim 3 wherein the sulfurous acid concentration of said aqueous sulfurous acid ranges from about 0.1 to about 10.0 wt. percent.

5. The process as in claim 1 wherein said oxidation promoter is chromium.

6. The process as in claim 1 wherein said oxidation promoter is manganese.

7. The process as in claim 1 wherein said oxidation promoter is iron.

8. The process as in claim 1 wherein said oxidation promoter is vanadium.

9. The process as in claim 4 wherein $n$ ranges from 5 to about 19.

10. The process as in claim 9 wherein the oxidation promoter is cobalt.

References Cited

UNITED STATES PATENTS

| | | | |
|---|---|---|---|
| 290,835 | 12/1883 | Bang et al. | 260—413 |
| 2,610,197 | 7/1947 | Cunningham | 260—413 |
| 3,105,851 | 10/1963 | Knobloch et al. | 260—525 |
| 3,118,948 | 1/1964 | Cull et al. | 260—530 |
| 3,298,779 | 1/1967 | Goto et al. | 260—604OXO |

OTHER REFERENCES

Sienko et al., "Chemistry," 2nd ed., McGraw-Hill, N.Y., 1961, p. 521.

JAMES A. PATTEN, Primary Examiner

R. S. WEISSBERG, Assistant Examiner

U.S. Cl. X.R.

260—413, 530